United States Patent [19]
Harada et al.

[11] Patent Number: 6,023,363
[45] Date of Patent: Feb. 8, 2000

[54] OPTICAL TRANSMISSION APPARATUS

[75] Inventors: Takashi Harada, Hidaka; Satoshi Ueno, Ome, both of Japan

[73] Assignee: Hitachi, Ltd., Tokyo, Japan

[21] Appl. No.: 08/885,815

[22] Filed: Jun. 30, 1997

[30] Foreign Application Priority Data

Jul. 1, 1996 [JP] Japan ..................................... 8-190040
May 19, 1997 [JP] Japan ..................................... 9-144645

[51] Int. Cl.$^7$ ................................................... H04B 10/04
[52] U.S. Cl. ......................... 359/187; 250/214 R; 330/75
[58] Field of Search ............................. 359/187; 330/110, 330/308, 75, 85, 260, 294; 250/214 A

[56] References Cited

U.S. PATENT DOCUMENTS 5,565,672  10/1996  Siegal et al. ........................ 250/214 R

OTHER PUBLICATIONS

"Analysis and Design of Analog Integrated Circuits" pp. 115–118, P.R. Gray and R.G. Meyer translated bu Yuzuru Nagata; published by Baifukan.

R. Reimann et al, "A Single–Chip Bipolar AGC Amplifier with Large Dynamic Range for Optical–Fiber Receivers Operating up to 3 Gbit/s", IEEE Journal of Solid–State Circuits, vol. 24, No. 6, Dec. 1989, pp. 1744–1748.

M. Moller et al, "13 Gb/s Si–Bipolar AGC Amplifier IC with High Gain and Wide Dynamic Range for Optical–Fiber Receivers", IEEE Journal of Solid–State Circuits, vol. 29, No. 7, Jul. 1994, pp. 815–822.

*Primary Examiner*—Leslie Pascal
*Assistant Examiner*—Dalzid Singh
*Attorney, Agent, or Firm*—Beall Law Offices

[57] ABSTRACT

An optical transmission apparatus includes a feedback amplification circuit having flat and wideband frequency characteristics in which the linearity within a band is excellent. As a result, frequency characteristics of the optical transmission apparatus are improved. A feedback amplification circuit is structured with an amplifier including a transistor receiving an input signal at the base thereof, a first feedback path including a feedback resistance provided between the input terminal and the output terminal of the amplifier, i.e., between the base and the collector of the transistor, in which a substantial phase margin added with the feedback gain thereof is set to a value obtained by adding a predetermined value to 60 degrees, and a second feedback path including an emitter follower circuit composed of a transistor and a constant current source and a feedback resistance, in which a substantial phase margin added with the feedback gain thereof is set to a value obtained by subtracting said predetermined value from 60 degrees or an approximate value thereof, as the basis.

8 Claims, 6 Drawing Sheets $\beta f1 = \beta 1 \cdot \exp(j\phi 1)$
$\beta f2 = \beta 2 \cdot \exp(j\phi 2)$
$\beta fd = \beta f1 + \beta f2 = \beta d \cdot \exp(j\phi d)$
$\beta d = \beta 0, \phi d = 120°$

OPTICAL TRANSMISSION APPARATUS

BACKGROUND OF THE INVENTION

The present invention relates to an optical transmission apparatus, and more particularly to a wideband optical receiving apparatus or an optical receiving module for converting a digital optical signal into an electric signal and a technique particularly effective in utilizing for improvement of frequency characteristics thereof.

Development of a wideband optical receiving apparatus or an optical receiving module is being proceeded as an optical transmission apparatus for converting a digital optical signal exceeding several GHz into an electric signal. Since the characteristic required for the wideband optical receiving apparatus or the optical receiving module is the application of a wideband signal in which the frequency of an optical signal has frequency components from a frequency close to a direct current to a frequency close to a transmission bit rate, it has been found that it will become important to form the frequency characteristics of various semiconductor integrated circuits or various amplification circuits to be used in the wideband optical receiving apparatus or the optical receiving module.

A wideband feedback amplification circuit which includes bipolar transistors (hereinafter referred to simply as transistors) as a basic element and can correspond to a high frequency signal at the level of several GHz is stated in, for example, "IEEE (Institute of Electrical and Electronics Engineers) Journal of Solid-State Circuits Vol. 24, No. 6" for December, 1989, pp. 1744–1748.

As shown in FIG. 7, the feedback amplification circuit described above is provided with a transadmittance type amplification circuit and a transimpedance type amplification circuit. The transadmittance type amplification circuit includes a pair of transistors T41 and T42 of differential configurations having bases for receiving an inverted input signal VInB and a non-inverted input signal VInT which are formed as voltage signals, respectively. Similarly, the transimpedance type amplification circuit includes a pair of transistors T11 and T12 of differential configurations coupled with collectors of transistors T41 and T42, respectively. Feedback resistances RF11 and RF12 are provided between the collectors and the bases of the transistors T11 and T12, respectively. Further, collector potentials of the transistors T11 and T12 become an inverted output signal OutB and a non-inverted output signal OutT that are voltage signals of a feedback amplification circuit after going through an emitter follower circuit having a two-step construction including transistors T5 and T6 or T7 and T8, respectively. What is called peaking capacity C1 is provided substantially in parallel with emitter resistances R41 and R42 between the emitters of the transistors T41 and T42. With this, it is aimed to enlarge the bandwidth in a high frequency area of the feedback amplification circuit.

On the other hand, in a feedback amplification circuit shown in FIG. 7, the frequency characteristics of the transimpedance type amplification circuit which is liable to produce band deterioration produces a great influence upon the frequency characteristics of the whole feedback amplification circuit. Further, in this transimpedance type amplification circuit, the feedback resistances RF11 and RF12 form a single feedback loop (a feedback path) making a feedback gain thereof to be β0 and phase delay to be φ0 as shown in FIG. 8 with respect to an open loop type amplifier A composed of the transistor T11 or T12. Furthermore, according to "Analysis and Design of Analog Integrated Circuits" p.117 under joint authorship with P. R. Gray and R. G. Meyor and under supervision of Yuzuru Nagata published by Baifukan, a feedback amplification circuit has the most flat and wideband frequency characteristics when a phase margin at a point where the loop gain becomes 1, in a word, a value obtained by subtracting the phase delay φ0 of the feedback loop from 180 degrees is set to 60 degrees.

SUMMARY OF THE INVENTION

The present inventors performed examination of an AGC amplification circuit having a feedback amplification circuit such as described above as a basic structure and examination of forming the AGC amplification circuit into a monolithic LSI (a semiconductor integrated circuit device) prior to the present invention in order to develop a wideband optical receiving module, and were confronted by the following matters.

Namely, in the feedback amplification circuit shown in FIG. 7, a peaking capacity C1 is provided in order to expand the bandwidth of the feedback amplification circuit. In order to realize this peaking capacity C1 on a semiconductor substrate, a comparatively large layout area becomes required, and thus the chip size of a monolithic LSI becomes larger and it is difficult to achieve a low cost thereof. Further, it has been found that parasitic components such as non-negligible capacity to substrate and series resistance exist in the peaking capacity C1 itself, and it is difficult to obtain sufficient frequency characteristics. Furthermore, it has also been found that excessive phase rotation or the like of a signal occurs in the vicinity of the peaking frequency due to the fact that the peaking capacity C1 is coupled in parallel with emitter resistances R41 and R42. Further, even when it is intended to design the phase margin at the point where the loop gain of a transimpedance type amplification circuit becomes 1 at 60 degrees, it is also difficult in a feedback amplification circuit having a single feedback loop, and desired frequency characteristics cannot be provided in the feedback amplification circuit.

It is an object of the present invention to provide an optical transmission apparatus having a wideband frequency characteristic.

It is another object of the present invention to provide an optical receiving module or an optical receiving apparatus including a feedback amplification circuit having flat and wideband frequency characteristics having excellent linearity within the band.

It is still another object of the present invention to provide an optical receiving module or an optical receiving apparatus capable of aiming at achievement of a low cost.

The above-mentioned and other objects and new features of the present invention will become apparent from this specification and accompanying drawings.

The summary of a typical invention among those disclosed in the present application will be described briefly as follows.

Namely, a feedback amplification circuit such as an AGC amplification circuit adopted in an optical transmission apparatus according to the present invention is composed basically of:

an amplifier receiving an input signal at an input terminal of the feedback amplification circuit;

a first feedback path provided between an input terminal and an output terminal of the amplifier, in which the substantial phase margin added with the feedback gain is set to a value obtained by adding a predetermined value to 60 degrees; and a second feedback path provided in parallel with the first feedback path, in which the substantial phase margin added with the feedback gain thereof is set to a value obtained by subtracting the predetermined value from 60 degrees or an approximate value thereof.

According to the above-mentioned means, it is possible to realize a feedback amplification circuit having a small area required for layout, and flat and wideband frequency characteristics having excellent linearity within the band on the basis of two feedback paths which have a phase margin of approximately 90 degrees or 30 degrees for instance, respectively, without providing peaking capacity, and can be designed comparatively easily. As a result, it is possible to improve frequency characteristics of an AGC amplification circuit including a feedback amplification circuit and a monolithic LSI (a large-scale integrated circuit) on which the feedback amplification circuit is formed, and furthermore, of an optical transmission apparatus, an optical receiving module or the like including these circuits. Furthermore, it is possible to reduce the chip size of the monolithic LSI or the like and aim at reduction in cost. With this, it is possible to achieve reduction in cost of an optical transmission apparatus, an optical receiving module, an optical receiving apparatus or the like including a monolithic LSI according to the present invention.

EMBODIMENTS OF THE INVENTION

Figure 10:
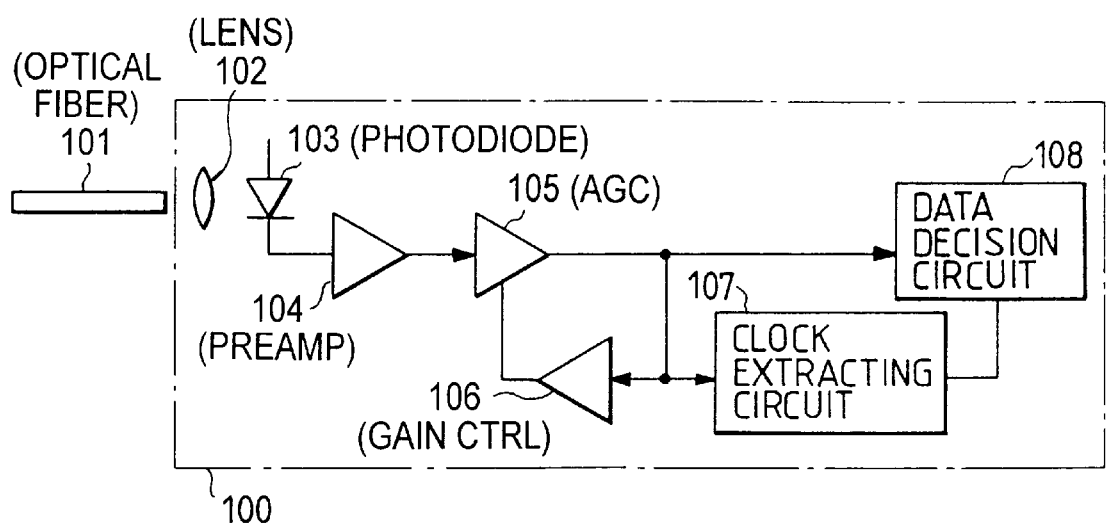
FIG. 10 is a block diagram showing an optical transmission apparatus or an optical receiving module applied with the present invention.

FIG. 10 shows an optical receiving module 100 which is an optical transmission apparatus or an optical receiving apparatus according to the present invention.

A digital optical signal of approximately 10 Gb/s (bit per second) (precisely, 2,488 GHz×4=9.952 Gb/s) which has been transmitted through an optical fiber 101 is converged by means of a lens 102 and inputted to a photodiode 103. The digital optical signal is converted photoelectrically into a current signal by the photodiode 103, and the converted current signal is inputted to a preamplifier 104. The preamplifier 104 applies current-to-voltage conversion, after the current signal is amplified, to the amplified current signal so as to generate a voltage signal. The voltage signal applied with the current-to-voltage conversion is inputted to an amplification circuit (AGC amplifier) 105 the gain of which is controlled automatically.

The amplitude of the output signal of the AGC amplifier 105 is detected by an amplitude detection and gain control circuit 106, and the amplitude detection and gain control circuit 106 outputs a control signal to a control terminal of the AGC amplifier 105 so that the amplitude of the output signal of the AGC amplifier 105 shows a predetermined signal amplitude. Namely, the AGC amplifier 105 is feedback-controlled. On the other hand, the output signal of the AGC amplifier 105 is inputted to a clock extracting circuit 107 composed of a narrow band filter such as a SAW filter, a PLL or the like, and, for example, a clock signal of 10 GHz is extracted from the received digital optical signal. A data decision circuit (a discriminating circuit) 108 decides a high level "1" or a low level "0" of the output signal of the AGC amplifier 105 synchronously with the high level or the low level of a clock signal generated from the clock extracting circuit 107. With this, the inputted digital optical signal is converted into digital data. The output signal of the data decision circuit is inputted to a 1 to 4 demultiplexer (DMUX) and converted into four signals of approximately 2.5 GHz each.

In such an optical receiving module 100, since the inputted optical signal is a wideband signal having frequency components from a frequency near a direct current to a frequency near a transmission bit rate, it is required that the gain frequency characteristics from the photodiode 103 to the AGC amplifier 105 are in an almost flat state, i.e., an even state in this wideband in order to detect the signal amplitude and regenerate a digital signal. When the above-mentioned frequency characteristics have large fluctuation within this band, the signal amplitude detected by a signal pattern also fluctuates. With this, a gain saturation margin of a circuit is reduced or insufficient amplitude is caused in some part of the amplification system. Furthermore, non-flatness of frequency characteristics gives rise to signal waveform distortion and causes substantial deterioration of the signal amplitude at the point of decision. As a result, insufficient decision sensitivity is caused in the data decision circuit 108, and an error rate of data regeneration is increased.

Further, fluctuation of gain frequency characteristics means that group delay characteristics of a signal are not flat in many cases, and increase of jitter components of an extracted clock signal is caused, thus decreasing a decision timing margin in the data decision circuit 108.

As described above, it is strictly required that the frequency characteristics of the comprehensive gain are flat in a circuit for handling an analog system signal from the preamplifier 104 to the data decision circuit 108 in the optical receiving module 100. In order to realize the flatness of the comprehensive gain, it is considered to be the most concise method to sufficiently secure gain flatness in respective circuit blocks (104 to 108) also in a sense of securing the gain saturation margin in respective circuit blocks (104 to 108). Accordingly, the flatness of the gain frequency characteristics of the AGC amplifier 105 is important in particular.

A time division multiplex system is adopted for an optical fiber transmission apparatus used in a recent trunk transmission system, i.e., a signal transmission system of a signal line connecting central offices from a viewpoint of economical efficiency, and a transmission bit rate at 10 Gbit/second (hereinafter 10 Gb/s) is being realized as the bit rate. An up-to-date device manufacturing process is used for the semiconductor technique used in the AGC amplifier 105 for amplifying a digital electrical signal of the bit rate described above. Even if so, however, it is very difficult to produce an AGC amplifier having a sufficient margin, which cannot be formed simply. The present invention will be explained hereinafter with reference to the drawings.

Figure 1:
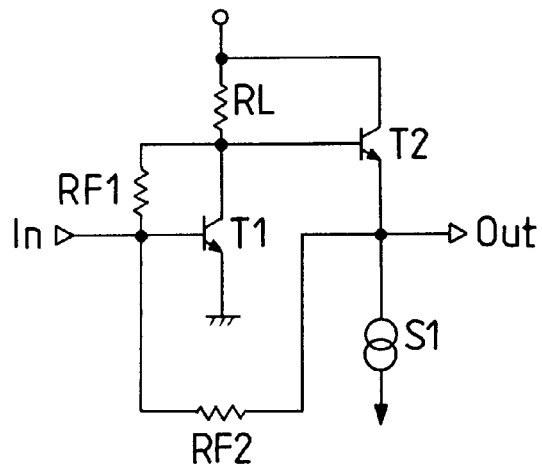
FIG. 1 is a circuit diagram showing a first embodiment of a feedback amplification circuit applied with the present invention.
Figure 2:
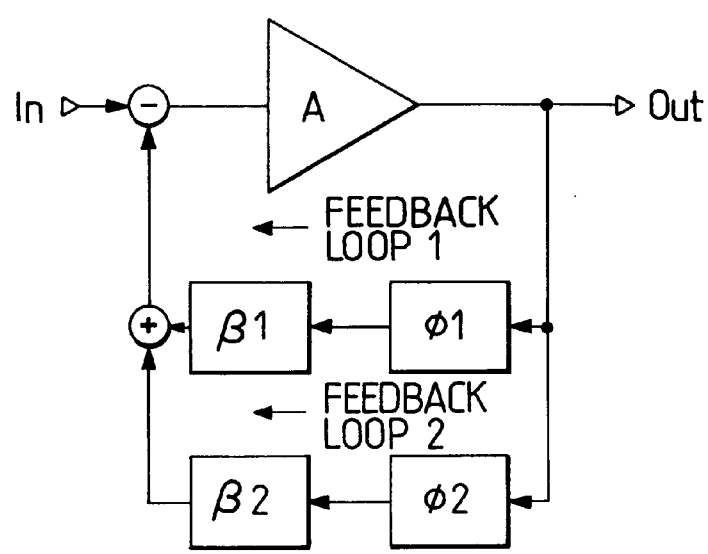
FIG. 2 is a basic block diagram of the feedback amplification circuit shown in FIG. 1.

FIG. 1 shows a circuit diagram of a first embodiment of a feedback amplification circuit adopted in the AGC amplifier 105 applied with the present invention. FIG. 2 shows a basic block diagram of the feedback amplification circuit shown in FIG. 1, and FIG. 3 shows frequency characteristic diagrams of an embodiment thereof. A structure, an operation and characteristics of the feedback amplification circuit of the present embodiment will be explained on the basis of these figures. Besides, the feedback amplification circuit of the present embodiment is mounted on a monolithic LSI (a large-scale integrated circuit) together with another circuit element not shown, and is formed on one piece of semiconductor substrate like a single crystal silicon by a technique of manufacturing a bipolar integrated circuit. All of the illustrated bipolar transistors are NPN transistors in the circuit diagrams hereinafter.

In FIG. 1, the feedback amplification circuit of the present embodiment includes a transistor T1 receiving at the base thereof an input signal In which is a current signal. A collector of the transistor T1 is coupled with a power supply voltage (a first power supply potential) of the circuit through a predetermined load resistance RL, and the emitter thereof is coupled directly with ground potential (a second power supply potential) of the circuit. With this, the transistor T1 constitutes an open-loop type amplifier A shown in FIG. 2, and inversely amplifies the input signal In which is a current signal and converts the signal In into a voltage signal at the collector thereof.

Figure 9:
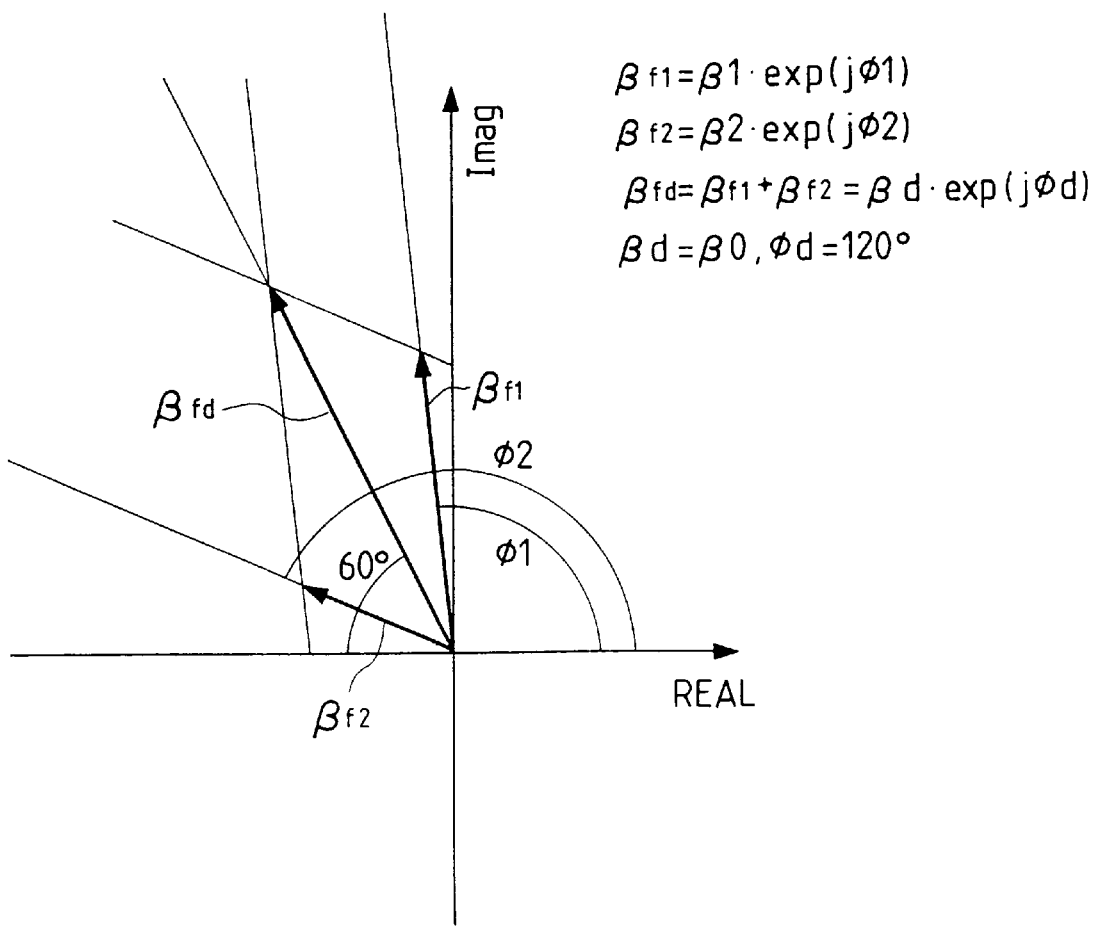
FIG. 9 is a vector diagram for explaining the present invention.

The feedback amplification circuit further includes an emitter follower circuit composed of a feedback resistance RF1 provided between an output terminal of the amplifier A, i.e., the collector of the transistor T1, and an input terminal of the amplifier A, i.e., the base of the transistor T1; a transistor T2 and a constant current source S1. Among these components, the feedback resistance RF1 forms a first feedback loop 1 shown in FIG. 2, and substantial phase delay $\phi 1$ added with a feedback gain $\beta 1$ of the feedback loop 1 is not limited in particular, but is made so that $90° \leq \phi 1 \leq 120°$ as shown in FIG. 9. With this, the finite difference of the phase delay $\phi 1$ of the feedback loop 1 from 180 degrees, that is, the phase margin is set to a value obtained by adding a predetermined value, that is $(120-\phi 1)$ degrees to 60 degrees. Besides, it has been known that, when a signal passes through an emitter follower circuit, the phase thereof is rotated. The present invention utilizes such a phenomenon.

On the other hand, the emitter follower circuit composed of the transistor T2 and the constant current source S1 transmits the collector potential of the transistor T1, that is, the output signal of the amplifier A to a circuit at a latter stage as an output signal Out of the feedback amplification circuit. Further, a second feedback loop 2 shown in FIG. 2 is structured together with a feedback resistance RF2 provided between the output terminal thereof, i.e., the emitter of the transistor T2 and the input terminal of the amplifier A, i.e., the base of the transistor T1, and a substantial phase delay $\phi 2$ added with a feedback gain $\beta 2$ of the feedback loop 2 is made so that $120° \leq \phi 2 \leq 180°$ as shown in FIG. 9. With this, the finite difference of the phase delay $\phi 2$ of the feedback loop 2 from 180 degrees, that is, the phase margin is set to a value obtained by subtracting the above-mentioned predetermined value, that is, $(\phi 2-120)$ degrees from 60 degrees. A desired feedback gain $\beta d$ and the phase delay 120 degrees are obtainable by selecting a gain $\beta 1$ of the feedback loop 1 and a gain $\beta 2$ of the feedback loop 2 appropriately and executing vector composition of these gains as shown in FIG. 9. As a result, the substantial phase delay of the feedback amplification circuit obtained by summing the feedback loop 1 and the feedback loop 2 becomes approximately 120 degrees and the phase margin becomes approximately 60 degrees as shown in FIG. 3 and FIG. 9.

Figure 3A:
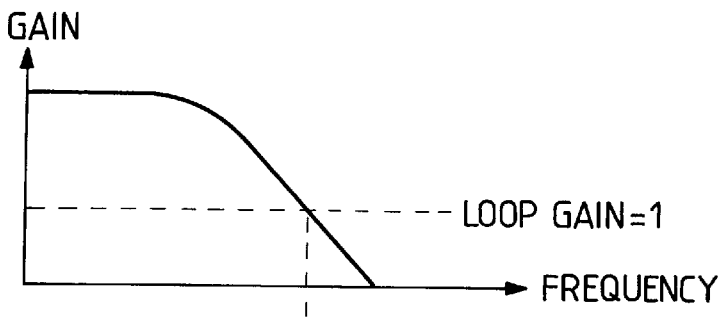
FIGS. 3(a), 3(b), 3(c), 3(d) and 3(e) show frequency characteristic diagrams showing an embodiment of the feedback amplification circuit shown in FIG. 1.
Figure 3B:
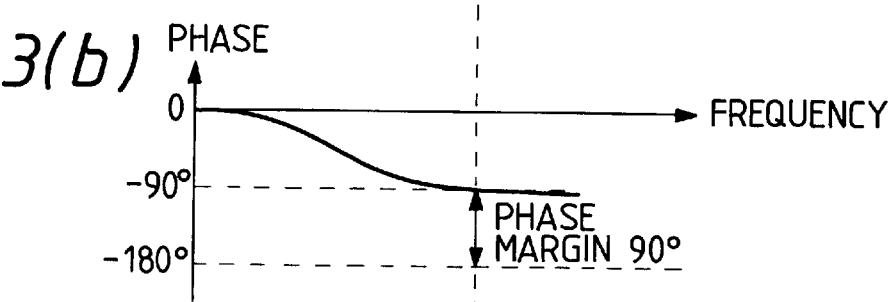
Figure 3C:
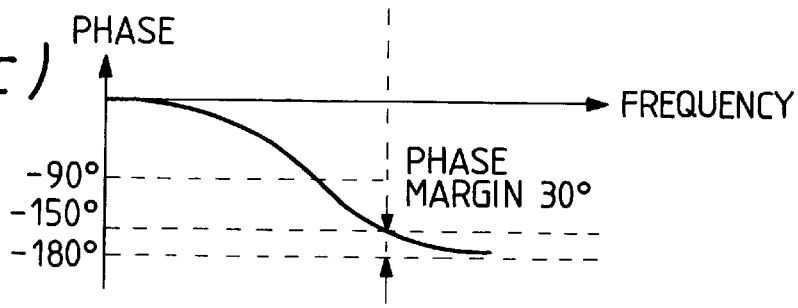
Figure 3D:
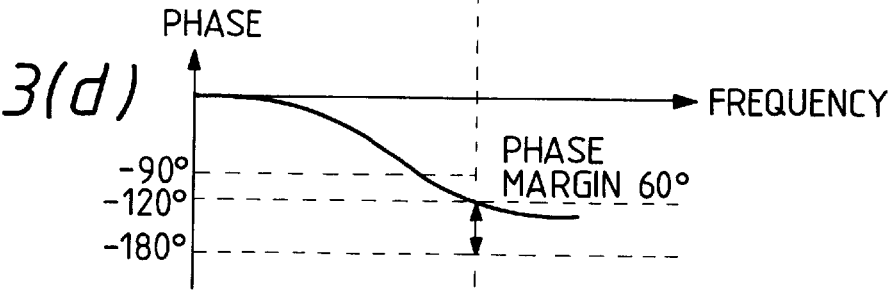
Figure 3E:
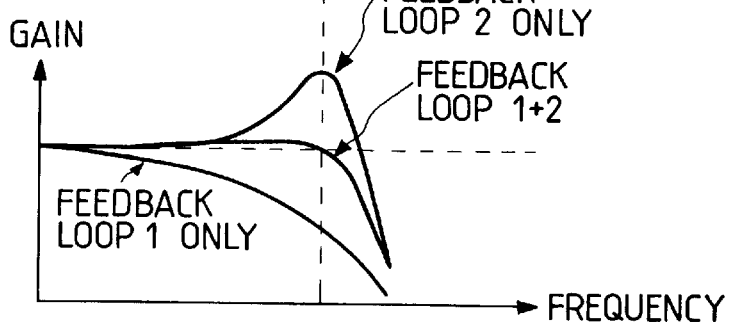

Now, as shown in "Analysis and Design of Analog Integrated Circuit" p. 117 and others under joint authorship with P. R. Gray and R. G. Meyer under the supervision of Yuzuru Nagata published by Baifukan, the feedback amplification circuit has the flattest and widest-band frequency characteristics when the phase margin at the point where the loop gain becomes 1 is set to 60 degrees. Therefore, when attention is paid only to the feedback loop 1 where the phase margin is set to approximately 90 degrees for instance, in the frequency characteristics of the feedback amplification circuit, the gain is lowered gently in a high frequency area and the bandwidth becomes narrower as shown in FIG. 3(e), but, when attention is paid only to the feedback loop 2 where the phase margin is set to approximately 30 degrees for instance, the gain produces temporary peaking in a high frequency area and the bandwidth becomes wider, but excessive phase rotation occurs by this peaking, and flatness of group delay of a signal is ruined.

In the case of the present embodiment including double feedback loops, however, since the phase margin as the whole becomes approximately 60 degrees, the feedback amplification circuit becomes to have the flattest and widest band frequency characteristics without requiring a peaking capacity. Further, because no peaking capacity is provided, it is possible to eliminate influence by parasitic portions of the peaking capacity and maintain linearity of a signal within the band of the feedback amplification circuit, and also to form the feedback amplification circuit with transistors and resistances only, thus reducing the area required for layout. From these facts, it is possible to realize a feedback amplification circuit having flat and wideband frequency characteristics having a small area required for layout and excellent linearity within the band on the basis of two feedback loops (feedback loop 1 and feedback loop 2) that can be designed comparatively easily. As a result, it is possible to improve the frequency characteristics of an AGC amplification circuit including a feedback amplification circuit and a monolithic LSI mounting the AGC amplification circuit, and also to reduce the chip size of the monolithic LSI thus aiming at a low cost thereof.

Figure 4:
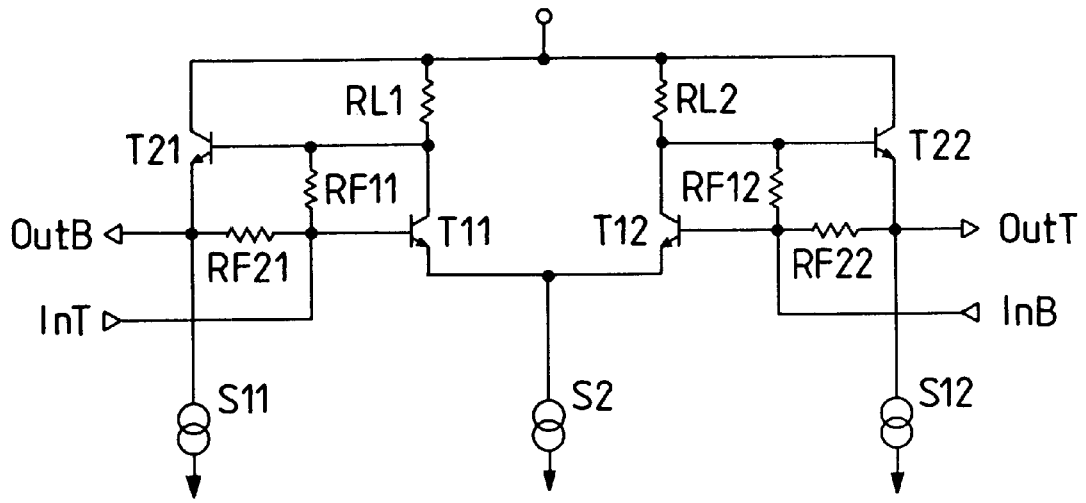
FIG. 4 is a circuit diagram showing a second embodiment of a feedback amplification circuit applied with the present invention.

FIG. 4 shows a circuit diagram of a second embodiment of a feedback amplification circuit applied with the present invention. Since the feedback amplification circuit of the present embodiment basically follows the embodiment shown in FIG. 1, explanation will be made additionally only on the portion which is different from the embodiment shown in FIG. 1. Transistors T11 and T12 shown in FIG. 4 correspond to the transistor T1 shown in FIG. 1, and transistors T21 and T22, load resistances RL1 and RL2, feedback resistances RF11 and RL12, feedback resistances RF21 and RL22 and constant current sources S11 and S12 shown in FIG. 4 correspond to the transistor T2, the load resistance RL, the feedback resistance RF1, the feedback resistance RF2 and the constant current source S1 shown in FIG. 1, respectively.

In FIG. 4, the feedback amplification circuit of the present embodiment includes a pair of transistors T11 and T12 that are brought into a differential configuration by coupling the emitters thereof in common. The commonly coupled emitters of these transistors T11 and T12 are coupled with the ground potential of the circuit through the constant current source S2, and a non-inverted input signal InT and an inverted input signal InB that are current signals are supplied to the bases thereof, respectively. Further, the collector potentials of the transistors T11 and T12 become a non-inverted output signal OutT and an inverted output signal OutB of the feedback amplification circuit after going through a pair of emitter follower circuits including transistors T21 and T22, and are supplied to a circuit at a latter stage not shown.

With this, the feedback amplification circuit of the present embodiment functions as what is called a differential type amplification circuit, performs stabilized differential amplification operation and can obtain effects similar to those of the embodiment shown in FIG. 1 by being provided with two feedback loops including the feedback resistances RF11 and RF21 and feedback resistance RK12 or RK22.

Figure 5:
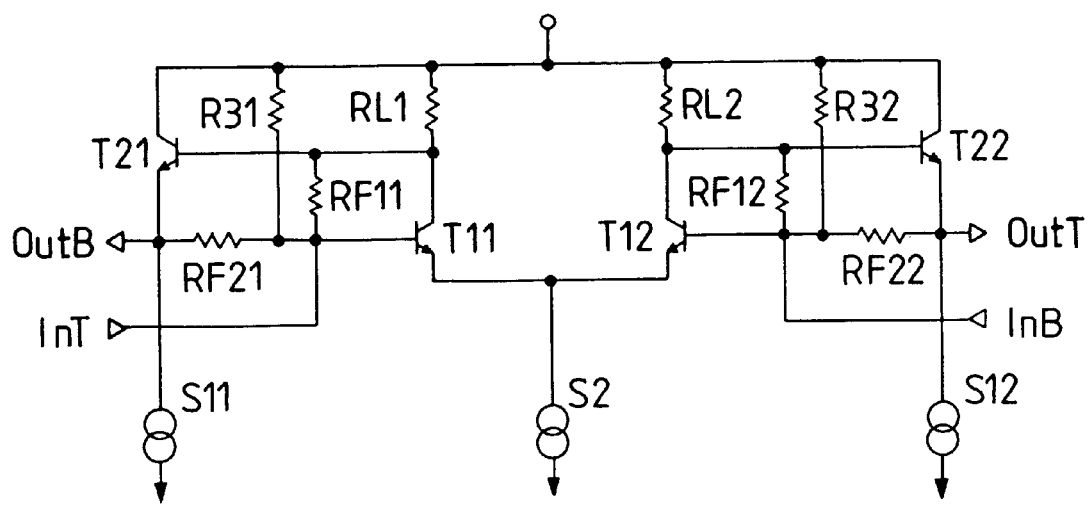
FIG. 5 is a circuit diagram showing a third embodiment of a feedback amplification circuit applied with the present invention.

FIG. 5 shows a circuit diagram of a third embodiment of a feedback amplification circuit applied with the present invention. Because the present embodiment basically follows the embodiment shown in FIG. 4, explanation will be made additionally only on the portion which is different from the above-mentioned embodiment.

In FIG. 5, the feedback amplification circuit of the present embodiment includes a pair of bypass resistances R31 and R32 provided between the power supply voltage of the circuit and the transistors T11 and T12 that are brought into a differential configuration, respectively. These bypass resistances R31 and R32 are applied with bypass currents corresponding to direct current components of an input signal that are current signals flowing out of the non-inverted input terminal InT and the inverted input terminal InB, respectively, and function so as to prevent the drop of collector potentials of the transistors T11 and T12 due to the fact that the direct current components are applied to the load resistance RL1 or RL2. As a result, the signal voltage of a circuit at the next stage which is to be connected to the signal output terminal OutB or OutT is secured sufficiently. As the result, in addition to the effect of the embodiment shown in FIG. 1, it is possible to enlarge dynamic ranges of the transistors T11 and T12 and compress the absolute value of the power supply voltage, thereby to aim at low voltage of the monolithic LSI. Besides, even when bypass resistances R31 and R32 are at an input impedance or higher, since the bypass resistances R31 and R32 are connected in parallel with each other, composite components of the input impedance are reduced.

Figure 6:
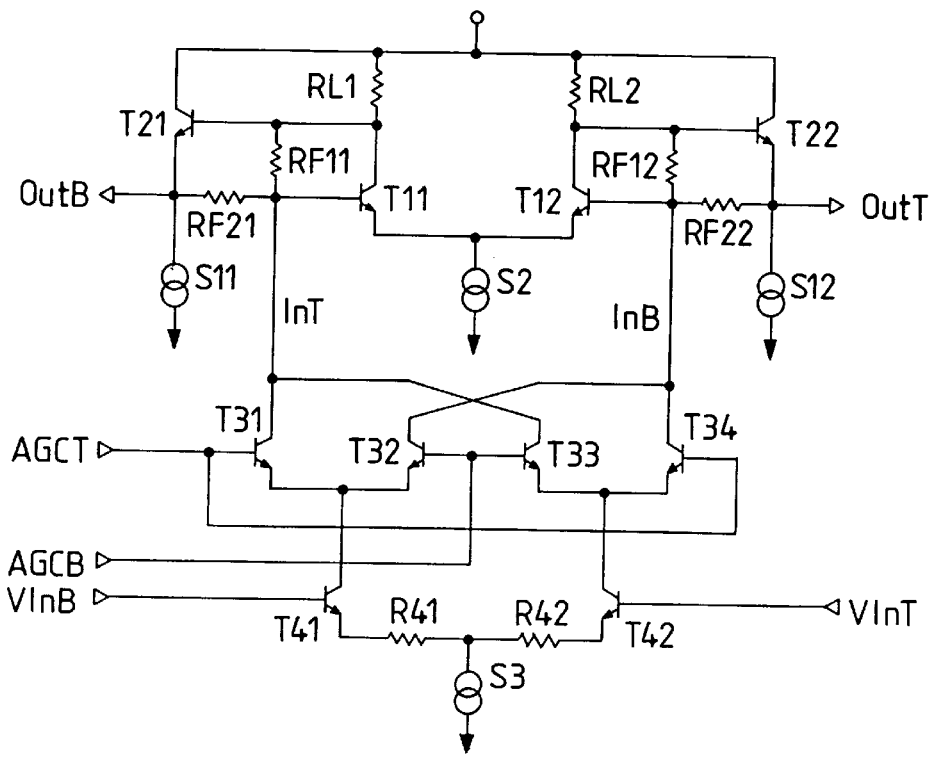
FIG. 6 is a circuit diagram showing a fourth embodiment of a feedback amplification circuit applied with the present invention.
Figure 7:
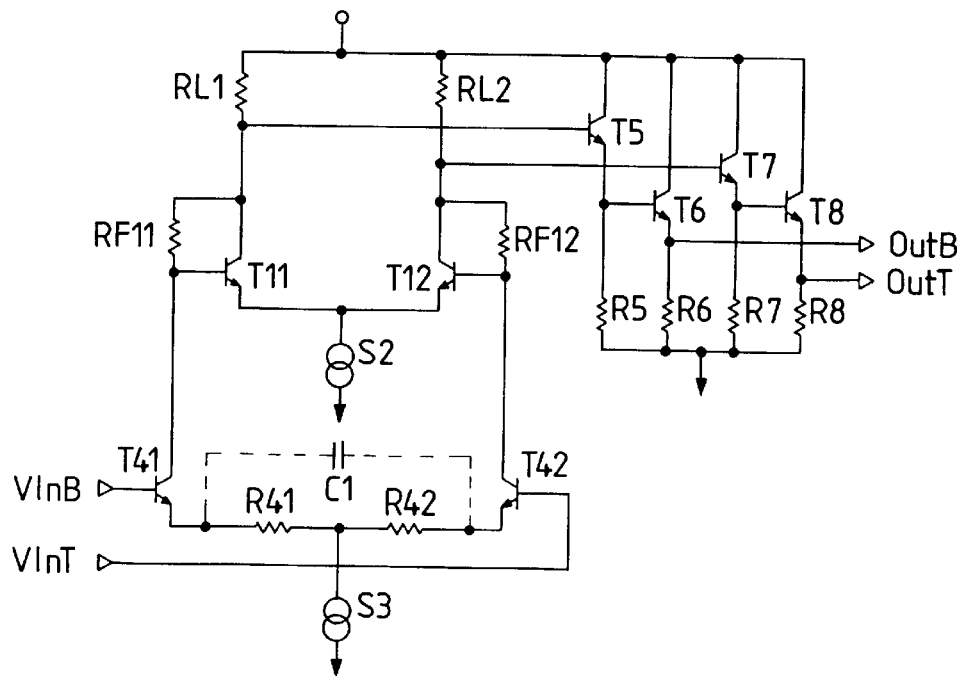
FIG. 7 is a circuit diagram showing an example of a conventional feedback amplification circuit.
Figure 8:
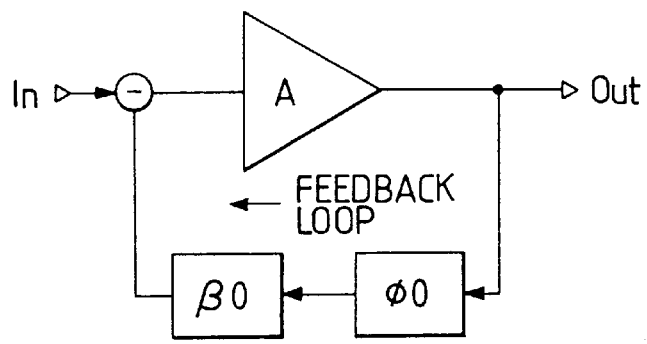
FIG. 8 is a basic block diagram of the feedback amplification circuit shown in FIG. 7.

FIG. 6 shows a circuit diagram of a fourth embodiment of a feedback amplification circuit applied with the present invention. Since the present embodiment basically follows the embodiment shown in FIG. 4, explanation is added only with respect to the portion different from the embodiment shown in FIG. 4.

In FIG. 6, the feedback amplification circuit of the present embodiment is what is called an AGC amplification circuit 105 (see FIG. 10), and is provided with a gain control circuit composed of two pairs of transistors T31, T32 and T33, T34 and what is called a transadmittance type amplification circuit including a pair of transistors T41 and T42. Among these circuits, collectors of the transistors T31, T33 and T32, T34 forming the gain control circuit are coupled in common with each other, and are coupled thereafter with the non-inverted input terminal InT or the inverted input terminal InB of the transimpedance type amplification circuit on the upper stage, i.e., the bases of the transistor T11 or T12, and the emitters of the transistors T31, T32 and T33, T34 coupled in common with each other are coupled with collectors of the transistor T41 or T42 forming the transadmittance type amplification circuit at the lower stage. Further, a non-inverted gain control signal AGCT is supplied to the bases of the transistors T31 and T34 coupled in common with each other from a gain control circuit not shown, and an inverted gain control signal AGCB is supplied to the bases of the transistors T32 and T33 coupled in common with each other.

On the other hand, the emitters of the transistors T41 and T42 forming the transadmittance type amplification circuit are coupled in common with each other through the emitter resistances R41 and R42, and are coupled further with ground potential of the circuit through a constant current source S3. Further, an inverted input signal VInB which is a voltage signal is supplied to the base of the transistor T41, and a non-inverted input signal VInT is supplied to the base of the transistor T42.

With this, the transadmittance type amplification circuit with the transistors T41 and T42 as basic elements converts the non-inverted signal VInT and the inverted input signal VInB that are voltage signals to current signals at the outputs of the transistors T41, T42 while amplifying these signals. Further, the gain control circuit with the transistors T31, T32 and T33, T34 as basic elements distributes a current signal obtained by a transadmittance type amplification circuit to the non-inverted input signal InT or the inverted input signal InB in accordance with the potentials of the non-inverted gain control signal AGCT and the inverted gain control signal AGCB, thus controlling substantial gain of the feedback amplification circuit. Furthermore, the transimpedance type amplification circuit with the transistors T11 and T12 as basic elements outputs, while amplifying the non-inverted input signal InT and the inverted input signal InB that are current signals, these signals to a circuit at a latter stage as a non-inverted output signal OutT or an inverted output signal OutB that are voltage signals.

From these circumstances, in the feedback amplification circuit of the present embodiment, functionality thereof is increased due to the fact that a gain control circuit is provided, and the bandwidth is expanded further and frequency characteristics thereof are improved further due to the fact that the transimpedance type amplification circuit and the transadmittance type amplification circuit are combined with each other.

The operational effects obtainable from the embodiments described above are as follows.

(1) By forming a feedback amplification circuit such as an AGC amplification circuit mounted on a monolithic LSI with an amplifier for receiving an input signal at the input terminal thereof, a first feedback path provided between an input terminal and an output terminal of the amplifier, in which a substantial phase margin added with the feedback gain of the amplifier is set to a value obtained by adding a predetermined value to 60 degrees, and a second feedback path provided in parallel with the first feedback path, in which a substantial phase margin added with the feedback gain thereof is set to a value obtained by subtracting the predetermined value from 60 degrees or an approximate value thereof as a basis, such an effect is obtainable that it is possible to realize a feedback amplification circuit having a small area required for layout and flat and wideband frequency characteristics with excellent linearity within the band without providing peaking capacity and on the basis of two feedback paths which have a phase margin at approximately 90 degrees or 30 degrees for instance, respectively, and can be designed comparatively easily.

(2) Such effects that it is possible to improve frequency characteristics of an AGC amplification circuit including a feedback amplification circuit and a monolithic LSI mounting the AGC amplification circuit or the like by the above-mentioned item (1), and also to reduce the chip size of the monolithic LSI or the like and aim to achieve a low cost thereof are obtainable.

(3) Such an effect that it is possible to realize a differential feedback amplification circuit having stabilized operation characteristics by forming a pair structure of the feedback amplification circuit in the above-mentioned items (1) and (2) is obtainable.

(4) Such effects that it is possible to prevent drop of a collector potential of a differential transistor and to expand the dynamic range thereof, thereby to aim at achievement of low voltage of a monolithic LSI or the like by providing a bypass resistance for bypassing direct current components of a non-inverted or inverted input signal which is a current signal between the power supply voltage of the circuit and the non-inverted and inverted input terminals of the differential feedback amplification circuit in the above-mentioned item (1) to item (3) are obtainable.

(5) Such an effect that it is possible to realize an AGC amplification circuit in which further expansion of a bandwidth and further improvement of frequency characteristics are achieved by providing a gain control circuit and a transadmittance type amplification circuit at a lower stage of a transimpedance type amplification circuit in the above-mentioned item (1) to item (4) is obtainable.

Thus, by applying such an AGC amplification circuit to an optical transmission apparatus or an optical receiving module, a low cost of the optical transmission apparatus or the optical receiving module, wideband frequency characteristics and improvement or flatness of linearity within the band can be achieved.

The invention which has been made by the present inventor has been described in concrete terms on the basis of specific preferred embodiments. However, the present invention is not limited to the above-mentioned embodiments, but it is a matter of course that the invention may be modified in various ways without deviating from the gist thereof. For example, in FIG. 1, various embodiments may be adopted for the concrete structures of the feedback loop 1 and the feedback loop 2 so far as the conditions of the phase delay, i.e., the phase margin are satisfied. Namely, for example, when the feedback loop 1 has a phase margin of approximately 100 degrees, that is, 60 degrees +approximately 40 degrees, it is sufficient that the feedback loop 2 is made to have a phase margin of 60 degrees− approximately 40 degrees, that is, approximately 20 degrees. In FIG. 6, the feedback amplification circuit is capable of including bypass resistances corresponding to the resistances R31 and R32 shown in FIG. 5 and is not necessarily required essentially to provide a gain control circuit. In FIG. 1, FIG. 4, FIG. 5 and FIG. 6, the concrete circuit structure of the feedback amplification circuit is not restricted by these embodiments, but various embodiments may be adopted for the polarity of the power supply voltages, the conduction type of the transistors and so on.

In the above description, explanation has been made for a case that the invention principally made by the present inventors has been applied to an optical transmission apparatus or an optical receiving module which is a field of utilization which has become the background of the invention, and to a monolithic LSI utilized therein and a feedback amplification circuit mounted on the monolithic LSI, but the invention is not limited thereto. For example, the invention can also be applied to various analog integrated circuits mounting a similar feedback amplification circuit, a communication apparatus including these analog integrated circuits and so on. The present invention can be applied widely to a semiconductor device mounting at least a feedback amplification circuit and an apparatus or a system including such a semiconductor device.

The effects obtainable by typical inventions among those disclosed in the present application will be described briefly as follows. Namely, by forming a feedback amplification circuit such as an AGC amplification circuit mounted on a monolithic LSI with an amplifier for receiving a predetermined input signal at the input terminal thereof, a first feedback path provided between the input terminal and the output terminal of the amplifier, in which the essential phase margin added with the feedback gain thereof is set to a value obtained by adding a predetermined value to 60 degrees, and a second feedback path provided in parallel with the first feedback path, in which the essential phase margin added with the feedback gain thereof is set to a value obtained by subtracting the above-mentioned predetermined value from 60 degrees or an approximate value thereof as the basis, it is also possible to realize a feedback amplification circuit having a small area required for layout and flat and wideband frequency characteristics having excellent linearity within the band without providing peaking capacity, and on the basis of two feedback paths which have a phase margin of approximately 90 degrees or 30 degrees for instance, respectively, and can be designed comparatively easily. As a result, it is possible to improve the frequency characteristics of an AGC amplification circuit including a feedback amplification circuit, a monolithic LSI mounting the AGC amplification circuit and so on, and also to reduce the chip size of the monolithic LSI or the like, thereby to aim at achievement of a low cost. Thus, it is possible to achieve a low cost of an optical transmission apparatus or an optical receiving module, wideband frequency characteristics and improvement or flatness of linearity within the band.

What is claimed is:

1. An optical transmission apparatus, comprising a feedback amplification circuit including:

an amplifier receiving an input signal at an input terminal thereof;

a first feedback path provided between the input terminal and the output terminal of said amplifier, in which a first phase margin added with a first feedback gain of the first feedback path is set to a first value obtained by adding a predetermined value to 60 degrees; and a second feedback path provided between the input terminal and the output terminal of said amplifier, in which a second phase margin added with the feedback gain of the second feedback path is set to a second value obtained by subtracting said predetermined value from 60 degrees.

2. An optical transmission apparatus according to claim 1, wherein:

said amplifier includes a first transistor receiving said input signal at the base thereof and a load resistance provided on a collector side of said first transistor;

said first feedback path includes a first feedback resistance provided between the collector and the base of said first transistor; and said second feedback path includes an emitter follower circuit including a second transistor with the base thereof coupled with the collector of said first transistor, and a second feedback resistance provided between the output terminal of said emitter follower circuit and the base of said first transistor.

3. An optical transmission apparatus according to claim 2, wherein said first phase margin of the first feedback path is set to said first value when the loop gain of the first feedback path becomes 1, and said second phase margin of the second feedback path is set to said second value when the loop gain of the second feedback path becomes 1.

4. An optical transmission apparatus according to claim 1, wherein said feedback amplification circuit is a differential feedback amplification circuit including a pair of said first transistors formed in a differential configuration and a pair of said first and second feedback paths provided corresponding to said pair of first transistors.

5. An optical transmission apparatus according to claim 4, wherein said feedback amplification circuit includes a pair of bypass resistance's provided between a first power supply voltage and the bases of said pair of first transistors, respectively, for applying direct current components of said input signal that is a current signal.

6. An optical transmission apparatus according to claim 4, wherein said feedback amplification circuit includes a transimpedance type amplification circuit with said pair of first transistors as basic elements, a gain control circuit provided at the lower stage of the transimpedance type amplification circuit, and a transadmittance type amplification circuit provided at the lower stage of the gain control circuit.

7. An optical transmission apparatus according to claim 1, wherein said first phase margin of the first feedback path is set to said first value when the loop gain of the first feedback path becomes 1, and said second phase margin of the second feedback path is set to said second value when the loop gain of the second feedback path becomes 1.

8. An optical transmission apparatus according to claim 1, further comprising:

a photodiode receiving an optical signal and converting the optical signal to a current signal;

an amplifier converting the current signal to a voltage signal and providing the voltage signal to the input terminal of said feedback amplifier as said input signal;

a clock extracting circuit receiving an output signal from said output terminal of said feedback amplifier and extracting a clock signal from the output signal;

a discriminating circuit receiving the output signal from the feedback amplifier, deciding a potential level of the output signal of the feedback amplifier synchronously with a predetermined level of the clock signal generated by the clock extracting circuit, and providing data; and a gain control circuit receiving the output signal from the feedback amplifier, detecting an amplitude of the output signal and generating a control signal for the feedback amplifier so that the amplitude of the output signal from the feedback amplifier becomes a predetermined amplitude.

* * * * *